Nov. 9, 1954
C. E. SMITH ET AL
2,693,744
RANGE FINDER FOR PHOTOGRAPHIC CAMERAS
Filed Dec. 12, 1950
3 Sheets-Sheet 1
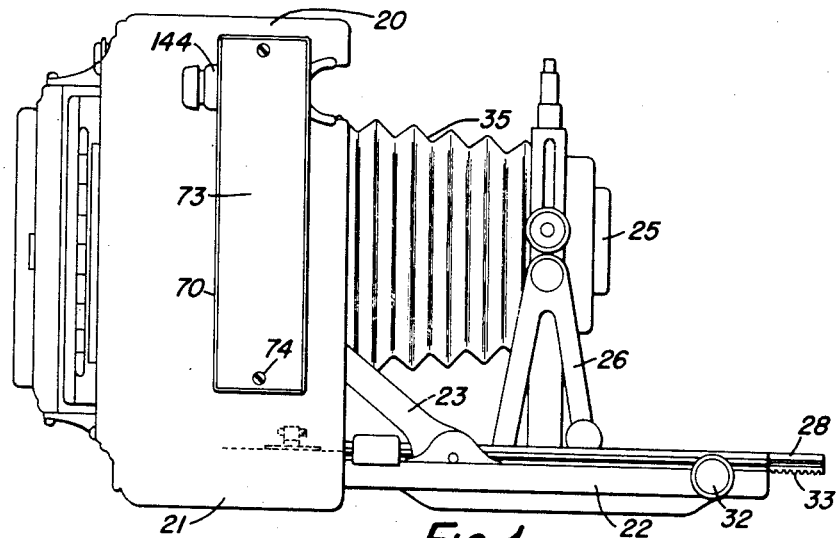
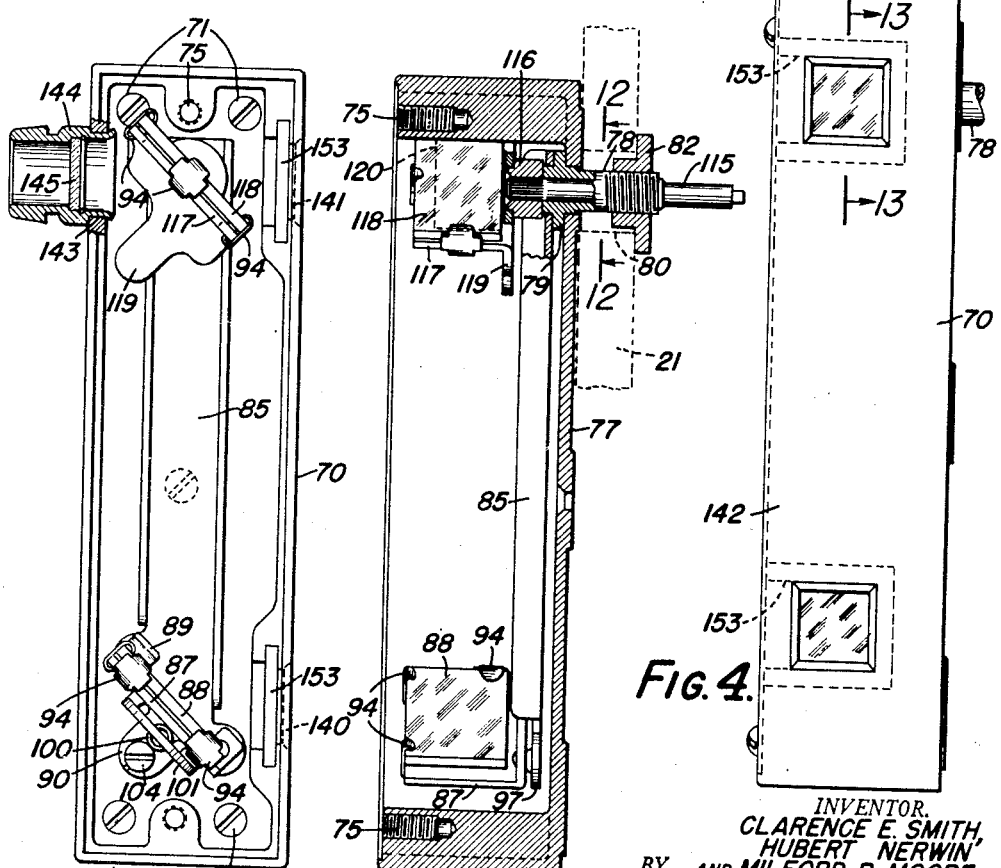
INVENTOR.
CLARENCE E. SMITH,
HUBERT NERWIN
BY AND MILFORD B. MOORE
ATTORNEY Nov. 9, 1954 — C. E. SMITH ET AL — 2,693,744
RANGE FINDER FOR PHOTOGRAPHIC CAMERAS
Filed Dec. 12, 1950 — 3 Sheets-Sheet 2

INVENTOR.
CLARENCE E. SMITH,
HUBERT NERWIN
AND MILFORD B. MOORE
BY
ATTORNEY

Nov. 9, 1954

C. E. SMITH ET AL 2,693,744

RANGE FINDER FOR PHOTOGRAPHIC CAMERAS

Filed Dec. 12, 1950

INVENTOR.
CLARENCE E. SMITH,
HUBERT NERWIN
BY AND MILFORD B. MOORE

ATTORNEY

United States Patent Office 2,693,744
Patented Nov. 9, 1954

2,693,744

RANGE FINDER FOR PHOTOGRAPHIC CAMERAS

Clarence E. Smith, Rochester, Hubert Nerwin, Irondequoit, and Milford B. Moore, Brighton, N. Y., assignors to Graflex, Inc., Rochester, N. Y., a corporation of Delaware Application December 12, 1950, Serial No. 200,414

4 Claims. (Cl. 95—44)

The present invention relates to range finders and more particularly to coupled range finders for photographic cameras.

It is common practice to attach a range finder to a camera so that the camera may properly be focused upon the object which is to be photographed. Conventional attached range finders have two mirrors disposed vertically one above the other, the upper mirror being fixed and being of the semi-transparent type, and the lower mirror being rotatable and being coupled to the lens board, or support for the front lens of the camera, so that when the lens board or support is moved in or out along the camera bed the lower mirror is swung on its axis of rotation. The user, upon looking into the eye piece of the range finder, sees two images of the object to be photographed, one reflected from the lower mirror and the rear face of the upper mirror, and the other visible directly through the transparent upper mirror. By adjusting the lens board or support of the camera forward or back these two images may be brought together, and when this is done the camera is in proper focus.

To rotate the lower mirror upon adjustment of the lens board or support, complicated lever systems are required in conventional attached range finders. These add to the cost of the range finder and increases the likelihood of the range finder getting out of adjustment.

Moreover, it has heretofore been the practice to mount the mirrors directly on the casing of the rangefinder and to secure that casing directly to the box or housing of the camera. As a result, expansion or contraction of the camera housing or of the rangefinder casing affects the mirror position, introducing errors which can affect the precision of focusing of the camera.

In conventional range finders, also, it is always difficult to position both mirrors so that they may lie in parallel planes. If the plane of one mirror is slightly tilted with reference to the plane of the other mirror, however, side image will be caused. This is always confusing and obstructs efficient use of the rangefinder. In conventional range finders, furthermore, the mirrors are cemented to their supports or backings. This is a messy job and not entirely satisfactory.

One object of the present invention is to provide a rangefinder which will be much simpler in construction than prior known rangefinders.

Another object of the invention is to provide a coupled rangefinder attachment for photographic cameras having a simpler coupling mechanism between the front lens and the rangefinder than has heretofore been employed.

Another object of the invention is to provide a rangefinder attachment for photographic cameras in which the lower mirror is fixed and the upper transparent mirror is made rotatable.

A further object of the invention is to provide an improved mounting for the window of a range finder attachment which will permit of quickly inserting or removing a window from its mounting.

A still further object of the invention is to provide a mounting for the fixed mirror which will permit of readily adjusting the plane of that mirror to be parallel to the plane of the rotatable mirror thereby to avoid side image.

Still other objects of the invention are to provide a rangefinder for attachment to a photographic camera which will be more durable than conventional range finders and more stable thereby insuring greater accuracy and longer life.

Other objects of the invention will be apparent hereinafter from the specification and from the recital of the appended claims.

In the drawings:

Fig. 1 is a side elevation of a camera in open position and showing attached thereto a rangefinder constructed according to one embodiment of this invention;

Fig. 2 is a view on an enlarged scale of the range finder with the outside cover of the rangefinder removed and with parts shown in section;

Fig. 3 is a section through the rangefinder taken at right angles to the view of Fig. 2;

Fig. 4 is a front elevation of the rangefinder;

Figure 6:
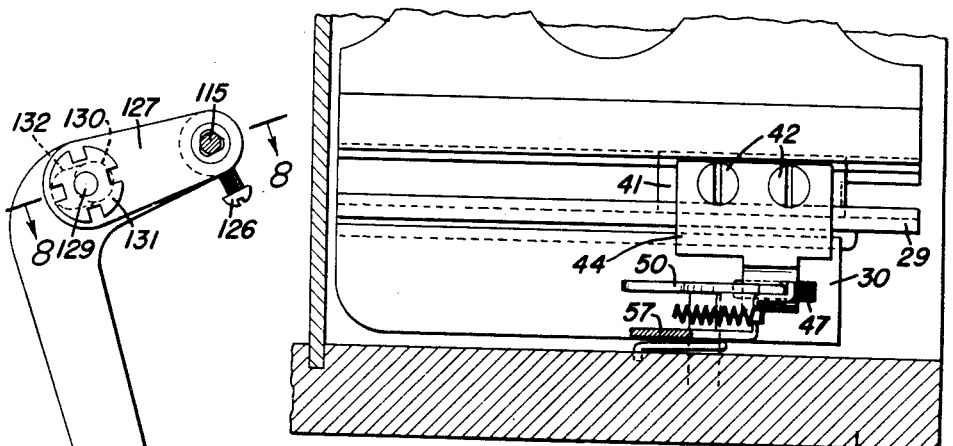
Fig. 6 is a fragmentary horizontal section through the camera box further showing the connection between objective slide and the mechanism which rotates the transparent mirror.

Referring now to the drawings by numerals of reference, 20 denotes the case or box of a conventional camera, and 22 denotes the bed of this camera. This bed is hinged to the camera box or casing 20 and is held in operative position by side arms 23.

The objective or front lens 25 of the camera is mounted in conventional manner by means of brackets 26 to a slide (not shown) (Figs. 1 and 6) which is adapted to be clamped in conventional manner to a pair of rails 28. The rails 28 are connected to aligned rails 29 by links or other conventional connecting means (not shown). The rails 28 and 29 are mounted to slide in the camera box 20 and on the bed 22, respectively. Thus, any movement imparted to the rails 28 is transmitted to the rails 29 causing them to travel in the guideways 30 (Fig. 6) of the camera box. The rails 28 are adjusted as usual by a focusing knob 32. This knob carries pinions (not shown) which engage racks 33 formed on the under side of the rails 28. The camera objective 25 is connected at one end to the bellows 35 of the camera in conventional manner. Only one rail 28 and one rail 29 are shown in the drawings of the present application but in conventional manner, as stated, there are two parallel rails 28 connected by links to two parallel rails 29.

Figure 5:
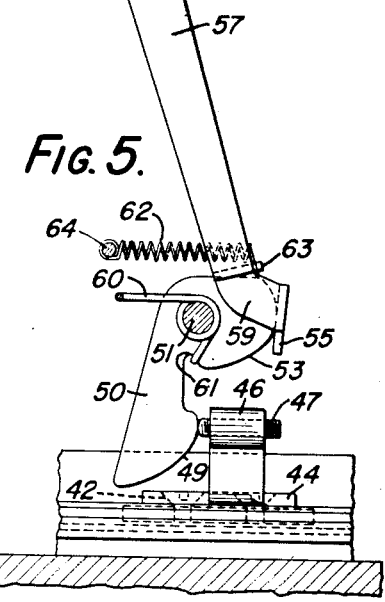
Fig. 5 is a fragmentary detail view showing the connection between the objective slide of the camera and the shaft on which the rotatable mirror is mounted.
Figure 7:
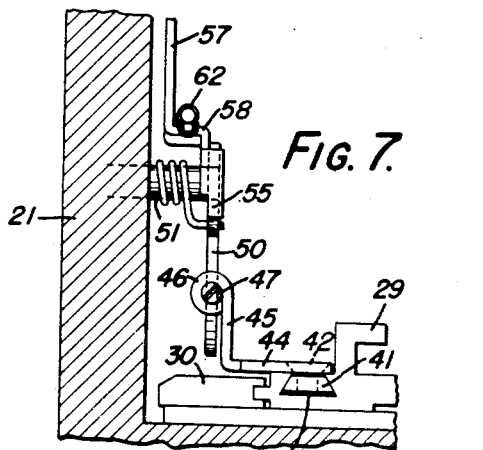
Fig. 7 is a front elevation of these parts.
Figure 9:
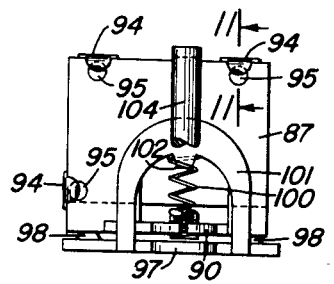
Figs. 9 and 10 are detail views taken at right angles to one another and showing the mounting of the lower mirror of the range finder.
Figure 10:
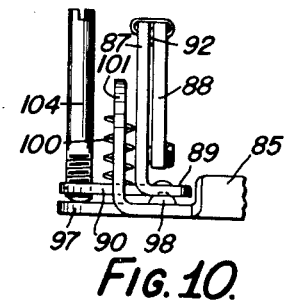

One rail 29 has a dove tailed groove 40 (Figs. 6 and 7) formed in it. Mounted in this groove is a correspondingly shaped block 41. Secured to this block as by means of screws 42 is a right angular shaped bracket 44. The terminal end of the upright portion 45 of this bracket is curled upon itself and threaded to receive an adjustable screw or follower 47. This follower engages the peripheral surface 49 of one lobe of a cam member 50 (Figs. 5 and 7). This cam member is rotatably mounted upon a stud 51 that is threaded into one vertical side wall 21 of the camera box 20.

The cam member 50 has a second peripheral cam surface or lobe 53. This cam surface 53 engages a follower 55 formed by bending laterally a portion of an arm 57. This arm is first bent laterally to provide an offset portion 58, then is bent parallel to itself to provide a portion 59, and then is bent laterally again to provide the follower 55. A coil spring 60, which is coiled about the stud 51 and which has one end engaged in a recess 61 in the cam 50, and which has its other end secured in the vertical wall 21 of the camera box, serves to hold the cam surface 49 against the yoke follower 47. A coil spring 62, which is engaged over a lug 63 formed on the arm 57 and which is secured at its other end to a pin 64 that is fastened in side wall 21 of the camera box, serves to hold the follower 55 in engagement with the cam surface 53.

Through the follower 47 and spring 60, motion of the slide 28 is transmitted to the cam member 50. Through the cam surface 53, follower 55 and spring 62, motion of the cam member 50 is transmitted to the arm 57. The arm 57 transmits motion to the rotatable transparent mirror of the range finder as will be described further hereinafter.

The rangefinder itself is housed within a casing 70 (Figs. 1, 2, 3 and 4) which is secured to the outside of the wall 21 of the camera case or box 20 by screws 71 (Fig. 2). The casing is rectangular in shape. Access may be had to its interior by removing the lid or cover 73. This lid or cover is secured in position at one side of the casing by screws 74 that thread into holes 75 in the casing walls.

Figure 12:
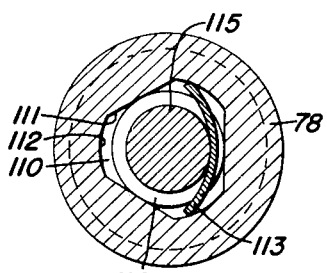
Fig. 12 is a section on the line 12—12 of Fig. 3 looking in the direction of the arrows and on an enlarged scale.

Mounted in that side wall 77 of the rangefinder casing 70, which is contiguous to the side wall 21 of camera casing 20, is a bolt or bearing member 78 (Figs. 3 and 12). The shank of this bolt or bearing member is externally threaded for part of its length. It is adapted to pass through a hole in the wall 77 of the rangefinder casing and through an aligned hole 80 in the vertical side wall 21 of the camera case. The head 79 of the bolt seats against the inside face of the wall 77 of the casing 70. A nut 82 threads onto the shank of the bolt inside the camera case to hold the head of the bolt tight in the rangefinder casing and in the camera box.

Silver-soldered or otherwise secured to the bearing member 78 is a beam 85 which is U-shaped in cross-section. Mounted upon this beam at the free end thereof is a support or bracket 87 which carries a mirror or reflector 88.

Figure 11:
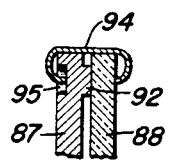
Fig. 11 is a fragmentary section showing the manner and means by which each mirror is secured to its mounting.

The bracket or support comprises a metallic stamping which extends in back of the mirror 88. This support is formed at its base with two forwardly-extending seating portions 89 (Figs. 2, 3, 9 and 10), and has a rearwardly projecting part 90 which is stamped out of the back portion of the sheet and bent down to lie substantially in the plane of the supporting lugs 89. The back portion of the support 87 is coined at three spaced points to form three spaced forwardly-projecting seating bosses 92 (Fig. 11). The mirror 88 is secured to the support 87 by three U-shaped spring clips 94, each of which has its free end bent inwardly toward one another. The spring clips are adapted to be engaged over the contiguous edge surfaces of the mirror and its support with the end of one leg of each clip engaging the front face of the mirror and the end of the other leg of each clip seating in a recess 95 formed in the back of the support 87 by the coining of a seat 92. The mirror is thus mounted with a three-point bearing upon the support 87 and held to the support under spring tension. Moreover, the clips 94 apply the spring pressure, which holds the mirror on the support, directly in line with the seats 92. A mounting is thereby provided for the mirror which will not transmit strains to the mirror. At the same time, a mounting is provided which permits the mirror to be easily and quickly assembled on its support. No cementing of the mirror to the support is required; and the mess and cost of a cementing operation are obviated.

The support 87 itself is mounted for tiltable adjustment on the U-shaped beam member 85. The side walls of this member are cut away near the outer end thereof to leave only a projecting tongue 97 on which the support 87 is carried. This projecting portion 97 is formed with two hemispherical bosses 98, which are laterally aligned, and which seat in hemispherical sockets stamped in the supporting lugs 89 of support 87. A coil spring 100 is interposed between the rearwardly projecting portion 90 of the support 87 and an arched yoke portion 101 stamped up from the extension 97 of the base portion of beam member 85. The spring is held at its upper end by a lug 102 formed on the center of the arch of yoke member 101. The spring tends to rock the support 87 counter-clockwise on the bosses 98, as viewed in Fig. 10. A screw 104, which threads into the rearwardly projecting portion 90 of the support 87 and which engages the top face of the extension 97 of the beam member 85 serves for adjustment of the support 87 angularly on the beam member 85. This adjustment is an adjustment useful in manufacture and assembly of the rangefinder, permitting the plane of the mirror 88 to be positioned so as to eliminate side image.

The bolt or bearing member 78 is bored to have a generally hexagonal shaped bore, as shown in Fig. 12. This bore has three equi-angularly-spaced, generally plane portions 111 and three alternating equi-angularly spaced concave portions 112. Journaled in the bore 110 of the bearing member 78 is a shaft 115 (Fig. 3). This shaft extends at its outside end through the bolt 78 into the range finder casing 70. Splined and soldered to the end of the shaft, which is inside the casing 70, is a collar 116 and brazed or soldered to this collar 116 is a support 117 for the semi-transparent mirror 118.

This support 117 is formed with a rearwardly bent fan tail portion 119. The mirror 118 is secured to the support 117 by three spring clips 94 which may be identical in construction with the spring clips 94 previously described and which engage at their front ends with the face of the mirror and seat at their rear ends in sockets formed by stamping the support 117 to provide bosses, similar to those of the mirror support 87, against which mirror 118 seats. The mirror support 117 is cut away, as shown in dotted lines 120 in Fig. 3, to permit light to pass through the mirror to the eye-piece of the range finder.

The shaft 115 is held in engagement with two spaced plane portions 111 of the bore 110 of bolt 78 by an arcuate leaf spring 113 which seats in a peripheral recess 114 formed in the shaft 115, and which is thereby held against axial movement relative to the shaft. This spring seats at opposite ends against two of the arcuate portions 112 of the bore 110. The spring holds the shaft against two of the plane side portions 111 of the bore 110 and serves itself as the third bearing for the shaft, thus providing a three point bearing mounting for the shaft. This bearing mounting prevents play between the shaft and the bore of bolt 78, and provides a much more accurate mounting for the shaft than would be possible were the bolt provided simply with a cylindrical bore matched as closely as possible in internal diameter to the external diameter of the shaft. No matching is here required and a better mounting results.

Figure 8:
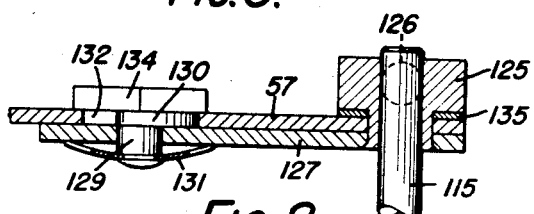
Fig. 8 is a section on the line 8—8 of Fig. 5 on an enlarged scale.

The shaft 115 projects at its inside end through the bolt 78 into the camera box. Secured to the end of the shaft, that projects into the camera box, is a hub member 125 (Fig. 8). This member is fastened to the shaft by a set screw 126 (Fig. 5). The hub member 125 is riveted to an adjusting arm 127 (Fig. 8) so that it is fixed to said arm near one end thereof. Secured in the other end of this arm 127 is a stud 129 which carries an eccentric 130. The eccentric is formed at one end with a square head 134, and is held against axial and angular movement relative to the arm by this head and by a spring washer 131 that is riveted to stud 129 at the other end thereof. The eccentric engages in an elongated hole 132 formed in the lever arm 57 coaxial with the stud 129. Interposed between the lever arm 57 and the hub 125 is a friction disc 135.

The eccentric 130, in conjunction with the follower screw 47, permits of precise angular adjustment of the mirror 118 so as to set the mirror correctly so that the infinity point of the range finder may correspond to the infinity point of the objective of the camera and so that the followers 47 and 55 may contact with the proper portions of the cam surfaces 49 and 53 to achieve the proper movement of the mirror in the focusing adjustment of the objective lens of the camera.

The cam surface 49 is shaped to impart uniform rotary motion to the cam 50 about the axis of shaft 51 as the objective lens of the camera is moved forward or backward in the focusing of the camera. The cam surface 53 is shaped to impart non-uniform motion to the lever 57. This produces the non-uniform pivotal motion of the mirror 118 required for the different varingly-spaced focus settings of the objective of the camera from infinity to its smallest focal distance. Through the follower 47, cam surfaces 49 and 53, follower 55, arm 57, and shaft 115, the semi-transparent mirror 118 can be made to track relative to the objective lens of the camera so that as the camera is focused the mirror 118 will move correctly as required for the rangefinding operation. By adjustment of follower 47 the point of engagement of this follower with cam surface 49 can be changed, and by adjustment of arm 57 relative to arm 127 the angular position of the mirror 118 can be varied relative to cam surfaces 49 and 53. Thus, the rangefinder can be adjusted to be used with different objective lenses in the camera.

Figure 13:
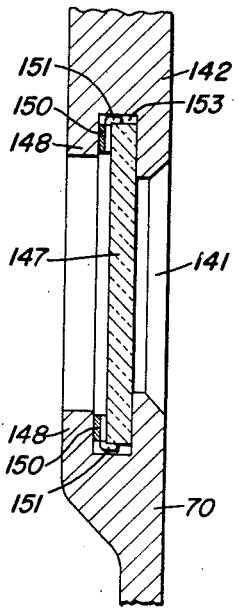
Fig. 13 is a fragmentary section on the line 13—13 of Fig. 4 looking in the direction of the arrows and showing the mounting of one of the windows of the range finder.
Figure 14:
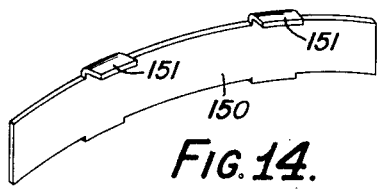
Fig. 14 is a perspective view of one of the leaf springs used in the window mounting.

The rangefinder casing 70 is completely sealed against passage of light except for the two window openings 140 and 141 (Fig. 2) in its front wall 142 (Fig. 4) and the opening 143 in its rear wall in which the eye piece 144 is mounted. The eye piece is of conventional construction and includes the eye glass or lens 145. The windows 147 (Fig. 13) are mounted in window grooves 153 in front of cast lugs 148 formed on the front wall 142 of the rangefinder casing. The windows are held in the window openings by leaf springs 150 which are inserted in the window openings behind the windows and interposed between the windows and the lugs 148. These leaf springs are arcuately curved and have lugs 151 formed on their sides to engage the side edges of the windows to retain the leaf springs against lateral movement. The springs can be readily inserted behind the windows or removed therefrom so that assembly and disassembly of the windows can be made very quickly.

Because of the simple linkage transmitting motion from the lens board of the camera directly to the transparent mirror 118 through the double-lobed cam 50 accuracy and low-cost are achieved. These features are enhanced by other features of our rangefinder. Thus, the three point mountings for the mirrors 88 and 118 by means of the spring clips 94 hold the mirrors securely without transmitting strain to them, and establish the plane of each mirror. Each mirror is clipped over the points of its location directly by the three spring clips. The mirrors 118 and 88 carried by shaft 115 and beam 85, respectively, are thereby mounted to be free of the effect of any distortion of the range finder case. The beam is furthermore secured at one end to a bolt 78 which serves not only as a bearing for shaft 115 but passes through the rangefinder case 70 and the camera case 20 to hold the two cases between the beam and the nut 82 that threads onto the bolt. The beam, moreover, can be made of annealed steel because of the simple shape employed. This further increases the rigidity of the construction thereby increasing the accuracy of the rangefinder.

While the invention has been described in connection with a specific embodiment thereof it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In combination, a camera having a bed, a slide slidable on said bed, an objective lens mounted on said slide to be adjustable upon movement of said slide for focusing, a casing having two windows fixed in its front wall one disposed vertically above the other, an observation window fixed in its rear wall, a reflector pivotally mounted in said casing in register with the upper of the two front windows and with said observation window, a relatively fixed reflector mounted in said casing in register with the lower of the two front windows, said pivotally mounted reflector being a semi-transparent mirror, a cam pivotally mounted in said camera and having two lobes, a cam follower engaging one of asid lobes and connected to said slide for movement upon adjustment of said slide, a second cam follower engaging the other of the cam lobes, and means connecting the second cam follower to said pivotally-mounted reflector to pivot said reflector upon movement of said second cam follower, the first cam lobe having its active surface shaped to impart uniform motion to said cam upon movement of the first cam follower, and the second cam lobe having its active surface shaped to impart non-uniform motion to said second cam follower upon movement of the cam.

2. In combination, a camera having an objective lens that is adjustable for focusing, a casing having two windows fixed in its front wall, one disposed vertically above the other, an observation window fixed in its rear wall in alignment with the upper of the two front windows, a reflector pivotally mounted in said casing in register with said upper front window and with said observation window, a relatively fixed reflector mounted in said casing in register with the lower of the two front windows, the pivoted reflector being semi-transparent, a pivotally mounted cam member, a cam follower engaging said cam member and connected to said objective lens to rock said cam upon adjustment of said lens, said cam follower being adjustable to adjust the point of its engagement with said cam member, a second cam member connected to the first cam member to move upon pivotal movement of the first cam member, a second cam follower engaging said second cam member, and an arm carrying said second cam follower, said arm being connected to the pivoted reflector to pivot said reflector upon movement of the second cam follower, and means for adjusting the pivoted reflector angularly relative to said arm.

3. In combination, a camera having an objective lens that is adjustable for focusing, a casing having two windows in its front wall, one disposed vertically above the other, an observation window in its rear wall in alignment with the upper of the two front windows, a reflector pivotally mounted in said casing in register with said upper front window and with said observation window, a relatively fixed reflector mounted in said casing in register with the lower of the two front windows, said pivoted reflector being semi-transparent, a pivotally mounted cam member, a cam follower engaging said cam member and connected to said objective lens to rock said cam upon adjustment of said lens, said cam follower being adjustable to adjust the point of its engagement with said cam member, a second cam member connected to the first cam member to pivot upon pivotal movement of the first cam member, a second cam follower engaging said second cam member, an arm carrying said cam follower, a second arm secured to said pivoted reflector, and means connecting said two arms so that movement of the first-named arm is transmitted to the second-named arm and thereby to said pivoted reflector, said last-named connecting means being adustable to adjust said pivoted reflector about its pivotal axis independently of the first-named arm.

4. In combination, a camera having an objective lens that is adjustable for focusing, a casing having two windows in its front wall, one disposed vertically above the other, an observation window in its rear wall in alignment with the upper of the two front windows, a reflector pivotally mounted in said casing in register with said upper front window and with said observation window, a relatively fixed reflector mounted in said casing in register with the lower of the two front windows, said pivoted reflector being semi-transparent, a pivotally mounted cam member, a cam follower engaging said cam member and connected to said objective lens to rock said cam upon adjustment of said lens, said cam follower being adjustable to adjust the point of its engagement with said cam member, a second cam member connected to the first cam member to pivot upon pivotal movement of the first cam member, a second cam follower engaging said second cam member, an arm carrying said second cam follower, a second arm secured to said pivoted reflector, and means connecting said two arms so that movement of the first-named arm is transmitted to the second-named arm and thereby to said pivoted reflector, said last-named connecting means comprising an adjustable eccentric member secured to one of said arms and engaging in an elongated hole in the other arm whereby upon adjustment of said eccentric member said pivoted reflector is adjusted on its pivotal axis independently of said first-named arm.

References Cited in the file of this patent

UNITED STATES PATENTS

| Number | Name | Date |
|---|---|---|
| 948,216 | Fluke | Feb. 1, 1910 |
| 1,261,643 | Stout | Apr. 2, 1918 |
| 2,154,958 | Polhemus | Apr. 18, 1939 |

(Other references on following page)

UNITED STATES PATENTS

| Number | Name | Date |
|---|---|---|
| 2,186,806 | Liebmann | Jan. 9, 1940 |
| 2,193,217 | Allen | Mar. 12, 1940 |
| 2,229,855 | Liebmann | Jan. 28, 1941 |
| 2,242,452 | Cazin | May 20, 1941 |
| 2,261,421 | Steiner | Nov. 4, 1941 |
| 2,267,811 | Brownscombe | Dec. 30, 1941 |
| 2,293,438 | Liebmann et al. | Aug. 18, 1942 |
| 2,376,982 | Schwartz et al. | May 29, 1945 |

FOREIGN PATENTS

| Number | Country | Date |
|---|---|---|
| 570,716 | Germany | Feb. 18, 1933 |
| 390,071 | Great Britain | Mar. 30, 1933 |
| 578,612 | Germany | June 15, 1933 |